United States Patent
Ferrari et al.

(10) Patent No.: US 8,051,889 B2
(45) Date of Patent: Nov. 8, 2011

(54) APPARATUS FOR TYRE-CHANGING MACHINES

(76) Inventors: Gino Ferrari, Correggio (IT); Franco Maioli, Correggio (IT)

( * ) Notice: Subject to any disclaimer, the term of this patent is extended or adjusted under 35 U.S.C. 154(b) by 233 days.

(21) Appl. No.: 12/516,565

(22) PCT Filed: Nov. 30, 2007

(86) PCT No.: PCT/IB2007/003682
§ 371 (c)(1),
(2), (4) Date: May 29, 2009

(87) PCT Pub. No.: WO2008/081235
PCT Pub. Date: Jul. 10, 2008

(65) Prior Publication Data
US 2010/0065224 A1 Mar. 18, 2010

(30) Foreign Application Priority Data
Dec. 4, 2006 (IT) .............................. MO2006A0398

(51) Int. Cl.
*B60C 25/138* (2006.01)
(52) U.S. Cl. ...................................... 157/1.28; 157/1.24
(58) Field of Classification Search ................. 157/1.17, 157/1.24, 1.28
See application file for complete search history.

(56) References Cited

U.S. PATENT DOCUMENTS

| 3,168,130 | A | 2/1965 | Turpin | |
|---|---|---|---|---|
| 4,047,553 | A | 9/1977 | Kotila | |
| 6,527,032 | B2 * | 3/2003 | Corghi | 157/1.28 |
| 7,108,036 | B2 * | 9/2006 | Spaggiari | 157/1.24 |
| 7,455,097 | B2 * | 11/2008 | Bonacini | 157/1.24 |
| 2004/0182520 | A1 * | 9/2004 | Spaggiari | 157/1.28 |
| 2007/0006975 | A1 * | 1/2007 | Corghi | 157/1.22 |
| 2008/0010804 | A1 * | 1/2008 | Giovannucci et al. | 29/426.5 |
| 2008/0173408 | A1 * | 7/2008 | Vignoli | 157/1.24 |

FOREIGN PATENT DOCUMENTS
EP 1479139 11/2004

OTHER PUBLICATIONS
WIPO, International Search Report, Mar. 10, 2009.

* cited by examiner

*Primary Examiner* — David B Thomas
(74) *Attorney, Agent, or Firm* — Themis Law

(57) ABSTRACT

An apparatus for tire-changing machines includes a base having a face turned upward, a supporting and locking platform for wheels, mounted rotating on such face around a rotation axis and defining a supporting and locking table, support means of tools extending upward from the base, the support means being movable along the base in a direction of movement perpendicular to the rotation axis, so as to move closer or away from the rotation axis.

16 Claims, 4 Drawing Sheets

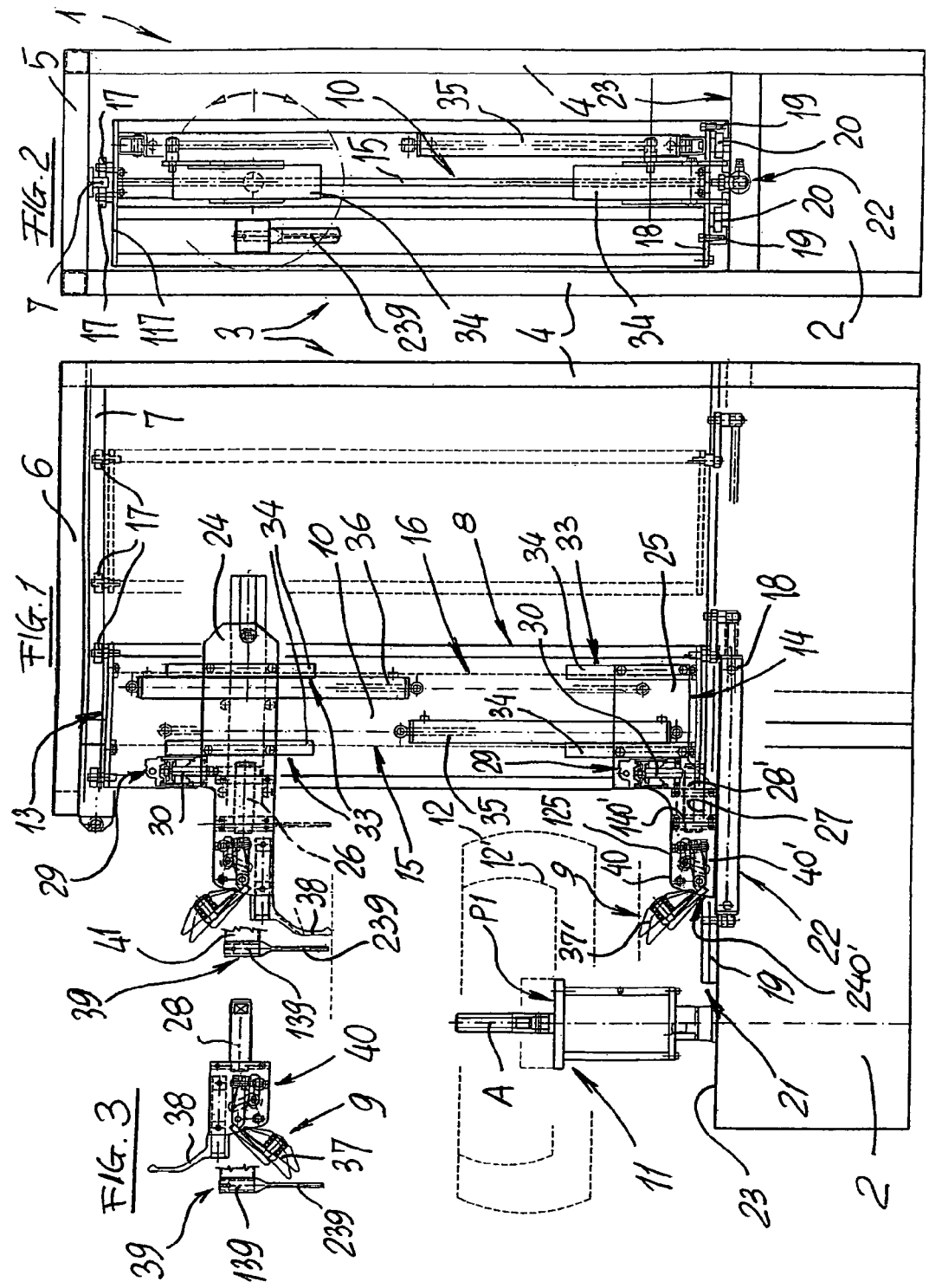

APPARATUS FOR TYRE-CHANGING MACHINES

TECHNICAL FIELD

The invention relates to an apparatus for tire-changing machines which includes base frame, generally boxed, that supports, on the face, a swivel platform, on which the wheels are rested and secured, and on which the operators fit and remove tires, and a fixed turret that extends upward and is configured to support a protruding tool-carrying arm.

TECHNOLOGICAL BACKGROUND

To perform fitting operations, the beads of a tire must first of all be bead broken from the edges of the rims on which they are normally fitted during wheel use.

To perform this operation, two technical solutions are provided in the prior art.

According to a first technical solution, tire-changing machines have an arm on the side of the base frame that has one end joined to the base frame, so as to turn on a plane parallel to the ground, and that has an opposite end with a bead breaking blade.

To bead break the beads, an operator turns the arm outward, so as to move it away from the side of the base frame, and then positions a wheel with the tire previously deflated, against the side in a substantially vertical position and, finally, starts a linear actuator located between the base frame and the arm, so the arm is recalled toward the side and, at the same time, the bead breaker blade presses on a bead segment of the tire, detaching this from the edge of the rim.

This operation is repeated several times, every time turning the wheel so the blade operates on the entire circumference of a bead turned outward and then, after turning the wheel on itself, is also repeated for the other bead.

When the tire is completely bead broken, it is substantially loose on the rim and the operator grips it and places it, together with the rim, on the swivel platform; on the latter the rim is secured by means of special grip parts and the operator proceeds to remove the tire from the rim.

For this operation, the operator uses a tool fitted on the fixed turret with the interposition of an adjustable support arm, which is shaped so as to be able to be wedged between the rim and the tire so that when the swivel platform is turned, the tool causes the bead to gradually exit from the edge of the rim with the consequent removal of a first side of the bead.

It must be pointed out that to wedge the tool between the tire and the edge of the rim, the operator must also use a lever with which he manually lifts a first portion of the tire off the rim, in such a way as to obtain a passage wide enough to insert the tool.

According to another technical solution, used to bead break the tires of particularly delicate wheels, such as, for example, the wheels of sports cars with light-alloy rims, the tire-changing machines have one or two bead-breaking tools that operate on the beads of the tires when the wheel is already positioned and fixed on the swivel platform.

Each tool consists of a disc shaped like a truncated cone and supported free to turn at the end of a corresponding support arm mounted on the tire-changing machine alongside the fixed turret.

Each disc has the edge of larger diameter intended to be placed in contact with the tire bead, at a point very close to the edge of the rim.

Each arm has its own operating system that raises or lowers it and which, therefore, determines the pressure of the disc on the bead turned upwards or the lifting from below upwards of the bead turned toward the ground; the operating system also normally envisages turning the arm, or each arm, when there are two, between a work position turned toward the swivel platform and a rest position away from this, and vice versa.

When there are two discs, one is mounted on an arm so it can press in a direction from the top downward on the upper bead while the other is mounted on another arm so it can press on the bead turned toward the ground in a direction from below upward.

The pressing action is normally done in a coordinated and contemporaneous way and the tire is completely beaded by rotating the platform while both discs press on the respective beads, turning freely on these.

Subsequently, to remove the tire from the rim, the operator proceeds as previously described both using the lever and completing removal by means of the tool fitted on the arm of the column of the tire-changing machine.

This state of the art has a number of drawbacks.

A first drawback is that to support the beading tools, the tire-changing machines must have special arms alongside the fixed turret on which, as it has been said, are fitted the tools for removing and fitting the tires on the rims.

Another drawback is that the arms must be positioned independently the one from the other and in such a way that the edge that has to be placed in contact with the bead is neither too close to the edge of the rim nor too far from this.

In the first case, the rims could be damaged during bead breaking operations, while in the second case, damage could be caused to the side of the tire, i.e. the side area of the tire between the beads and the tread, which is considerably more flexible and fragile than the beads.

A further drawback is that the correct positioning of the lower arm and, therefore, of the relevant disc on the corresponding lower bead, is very difficult because visibility is strongly reduced by the tire itself, by the rim, by the platform and by the base frame of the tire-changing machine.

Furthermore, the free space between the platform and the base frame is strongly limited and for this reason it is even more difficult for the operator to visually control, in a direct way, the correct positioning of the lower bead breaking disc.

Some manufacturers of tire-changing machines, to try and at least partially solve this problem, have equipped the tire-changing machines with a reflection member, typically a mirror, fitted near the lower face of the swivel platform, which allows the operator to observe the image reflected from below upwards of the tire area on which the bead breaking disc has to rest.

Other manufacturers have decided to fit a camera instead of the mirror and have also equipped the tire-changing machine with a small screen connected to the camera that allows the operator to observe the bead area during the positioning of the lower bead-breaking disc.

These solutions have further drawbacks.

Another drawback is that the costs of the reflecting devices or of the cameras and of the screens connected to these negatively affect the total costs of the tire-changing machines.

Another drawback is that the field of vision of the reflecting devices or of the cameras is considerably limited and in any case produces an indirect vision which is therefore subject to optical distortions.

Another drawback is that the operating space in the area between the lower face of the platform, in itself already very small, is further reduced by the presence of these devices.

A further drawback is that both the reflecting devices and the cameras are subject to becoming quickly dirty and, therefore, to be able to help the operator in his/her work, they require frequent cleaning and maintenance.

A further drawback of the known tire-changing machines is that the arms that support the bead-breaking tools are fitted on the base frame of the tire-changing machines separately from the fixed turret and each of these has to be driven by its own actuator.

This results in a considerable increase in the overall dimensions of the tire-changing machines and in their having a fairly complicated structure both in terms of manufacture and function.

OBJECTS OF THE INVENTION

One object of the invention is to improve the state of the art.

Another object of the invention is to make an apparatus for tire-changing machines that allows bead breaking the beads of the tires from the relative edges of the rims on which they are fitted and removing or fitting the tires from/on the rims quickly and without any risk of damage.

A further object of the invention is to make an apparatus for tire-changing machines that allows bead-breaking the beads of the tires without requiring auxiliary devices in order to see the beads turned toward the ground in the beading position on the work platforms.

Another object of the invention is to develop an apparatus for tire-changing machines that has a much simpler structure compared to the known state of the art, restricting the number of actuators needed for bead breaking and for fitting or removing the tires on/from the relative rims.

SUMMARY OF THE INVENTION

According to one aspect of the invention, an apparatus for tire-changing machines includes a base that has a face turned upward, a supporting and locking platform of wheels, mounted rotating on said face around a rotation axis and defining a supporting table, support means of tools extending upward from said base, said support means being movable along said base in a direction of movement perpendicular to said rotation axis, so as to move nearer or away from said rotation axis, wherein said tools comprise bead breaking elements to bead break or remove beads of tires from rims of said wheels, and one introduction member fitted on first carriage means to hold said beads inside respective rims cooperating with said breaking elements, extraction tools.

According to another aspect of the invention, a method suitable for fitting or removing tires of wheels on/from rims includes: tightening said wheels on a supporting and locking platform of a tire-changing machine, rotating around a rotation axis and defining a supporting and locking table; positioning fitting or removal tools in an operating position near said wheels, wherein said fitting or removal tools can be fitted on a common support element shaped as a support column raising from said tire-changing machine, and wherein said positioning comprises moving said common support column on/with respect to said tire-changing machine between a fitting or removal position near said platform and an idle position, away from the platform, and vice versa, said fitting or removal tools comprising bead-breaking tools, introduction tools, or extraction tools.

The apparatus for tire-changing machines and the related method thus permit fitting or removing tires from the rims and bead-breaking the beads of the tires from the rims in a precise and safe way, without any danger of damaging the sides of the tires or of the rims on which they are fitted and without the need to have auxiliary devices available to see the positioning of the introduction element turned toward the ground.

BRIEF DESCRIPTION OF THE DRAWINGS

Further characteristics and advantages of the invention will appear more evident from the detailed description of a bead-breaking apparatus for tire-changing machines, illustrated indicatively by way of non limiting embodiments, in the attached drawings wherein:

FIG. 1 is a side schematic view of a tire-changing machine with an apparatus for tire-changing machines according to the invention;

FIG. 2 is a front schematic view of the tire-changing machine of FIG. 1;

FIG. 3 is a detailed view of a bead-breaking tool and of an introduction member that can be fitted on tool-carrying support means according to the invention;

DETAILED DESCRIPTION OF EMBODIMENTS OF THE INVENTION

Figure 5:
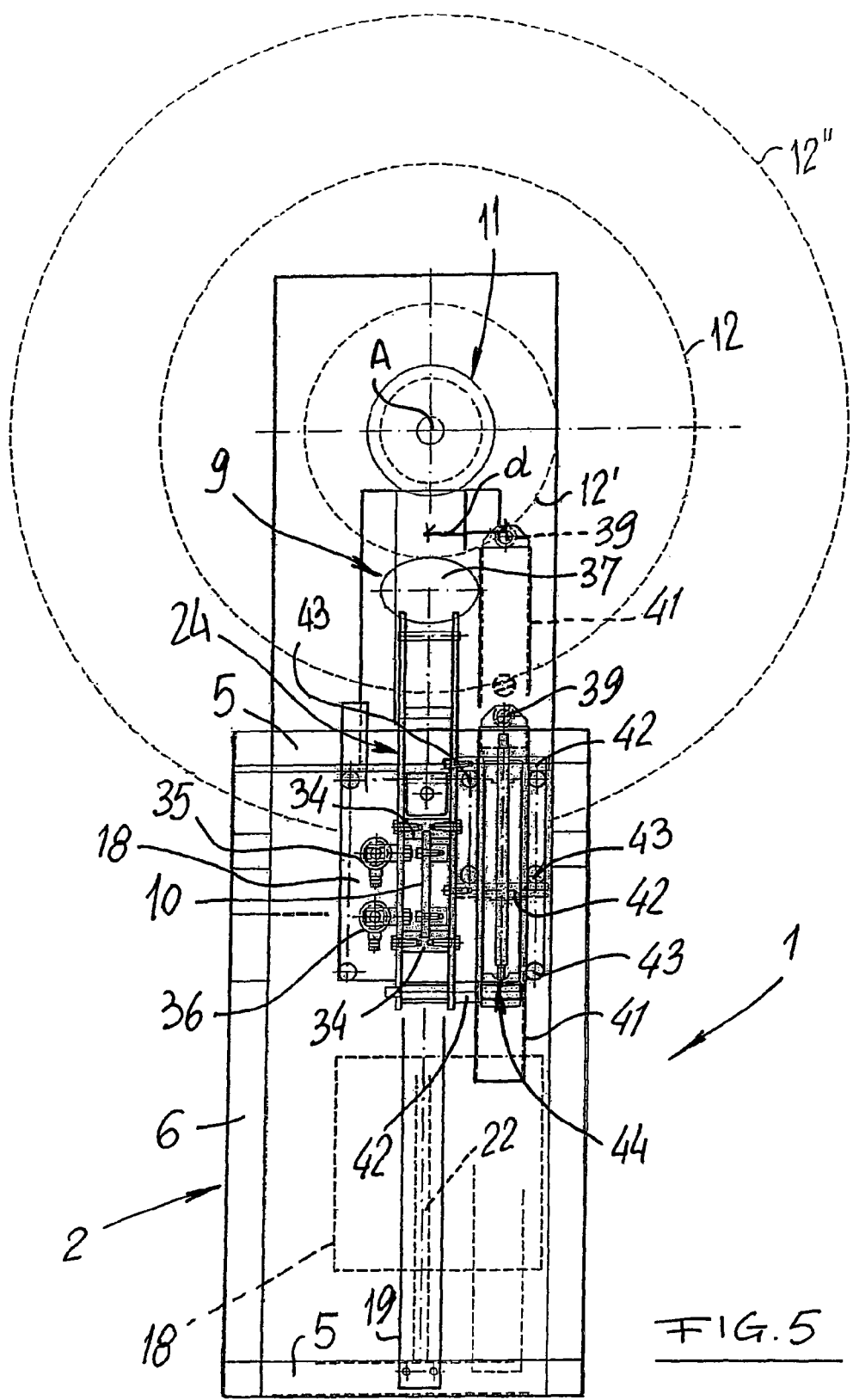
FIG. 5 is a schematic plan view of the tire-changing machine of FIG. 1.

With reference to FIGS. 1, 2, 5, by 1 has been generally indicated a tire-changing machine that comprises a base 2 and a frame 3 that extends upwards and which is formed of uprights 4, transoms 5 and upper side members 6.

The transoms 5 bear a centred and straight upper longitudinal guide 7 turned toward the base 2, the function of which will be explained later on.

From the base 2, a supporting and locking platform 11 also rises up, in short a platform 11, that can turn around a rotation axis "A", driven by its own motor unit inside the base 2, and which defines a supporting table "P1", for locking on this wheel tire rims 12 or 12' or 12" of vehicles, which can have different diameters and which are indicated in FIG. 1 with broken lines.

The rotation axis "A" is normally vertical, nevertheless, according to other possible embodiments of tire-changing machines 1, the rotation axis "A" could also be oblique.

The column 10 has a substantially flat rib and parallelepiped shape defining an upper side 13 and a lower side 14 parallel with each other and a first front edge 15 turned toward the platform 11, and an opposite and parallel second edge 16 turned in the opposite direction. The top side 13 has a first cross wing 117 connecting together the concurrent upper ends of the uprights 4, which supports pairs of coupling members, for example a series of rollers 17 that are free to turn, and which can be coupled to the upper longitudinal guide 7, while the bottom side 14 features a second cross wing 18 which, on the lower face, has a pair of runners 19 that couple in a sliding way to a lower longitudinal guide 20 fastened on the base 2 and having one end located near the platform 11.

The upper longitudinal guide 7 and the lower longitudinal guide 20 are aligned and parallel with each other so as to keep the column 10 vertical both when movement is stopped and when the column 10 moves toward, or away from, the platform 11.

The lower longitudinal guide 20 is also straight and lies on a vertical plane that also contains the column 10; the lower longitudinal guide 20 has one end indicated by 21, located close to the supporting and locking platform 11.

The column 10 is therefore mobile forwards and backwards, in parallel fashion, along the upper longitudinal guides 7 and lower longitudinal guides 20 with respect to the rotation axis "A" of the platform 11, and the movement can be started by means of a linear actuator unit 22 located inside the base 2, below an upper face 23 of the latter which has ends integral with the latter and with the second cross wing 18 respectively, so as to push or pull it, also dragging along with it the column 10, which is thus able to approach the platform 11 or move away from it.

Along the column 10 are fitted sliding support means for supporting the tools 9, which comprise two carriages 24 and 25.

The carriage 24 is located above the carriage 25, as can be seen in FIG. 1, and these are located on the opposite side respectively with respect to the supporting table "P1"; these comprise a portion that protrudes toward the platform 11. The two portions of each carriage, which have fixed lengths, are indicated by 124 and 125 respectively.

Figure 4:
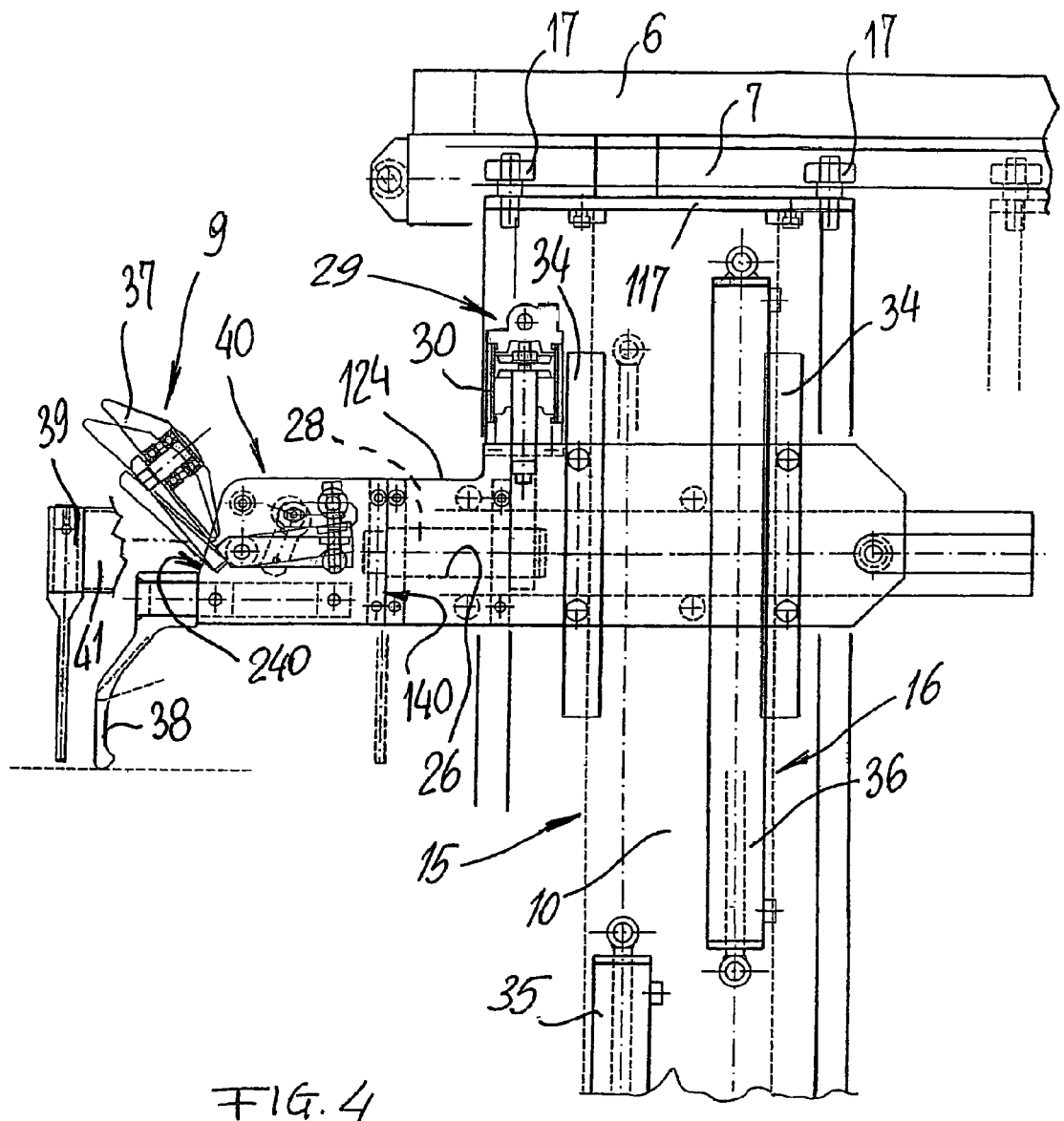
FIG. 4 is a side schematic and interrupted view and on enlarged scale of the bead-breaking tool and of the introduction member of FIG. 3, in a configuration assembled on tool-carrying support means.

With reference to FIG. 1 and to FIG. 4, it will be seen that each portion 124 or 125 has a coupling seat, indicated by 26 and 27 respectively, for coupling the tools 9.

The tools 9 correspondingly have their own tang 28 and 28' for coupling in the seats 26 and 27, which have respective locking parts 29 of the tangs 28 and 28', also suitable for preventing the rotation of the tools 9 when they are fitted on the respective carriages 24 and 25 and are ready for use.

These locking parts 29 comprise, for each of the seats 26 and 27, a fluid-dynamic operating cylinder 30 housed on the carriages 24 and 25 in special housings envisaged on the latter, which is supported with transversal axis with respect to the seats 26 and 27.

The fluid dynamic cylinder 30 has the rod 31 ready to be introduced into a transversal opening 32 obtained in both the tang 28, and in the tang 28', in such a position that when the tools 9 are fitted on their respective carriages 24 and 25, the transversal opening 32 is aligned with the rod 31, which can introduce itself into it and prevent the tangs 28 and 28' both from moving in an axial direction and from turning.

Each of the carriages 24 and 25 has respective coupling means 33 sliding and guided along the first front edge 15 and the second rear edge 16.

The coupling means 33 comprise pairs of runners 34 that are shaped with a "C" cross section, so they can be engaged and slide on the first front edge 15 and on the second rear edge 16 of the column 10.

The sliding of the carriages 24 and 25 is by means of a pair of linear actuators 35 and 36, each of which is made to move one of the carriages along the column 10.

The tools 9 that can be fitted on the carriages 24 and 25 comprise respective bead-breaking discs 37 and 37', and an extraction claw 38 and an introduction member 39.

According to one embodiment, on the upper carriage 24 are supported a bead-breaking disc 37 and the extraction claw 38, paired together and fitted on a head 40 which houses them both, but in contrasting operating positions, i.e. in such positions that they can be used one instead of the other and never together. The alternative use occurs by releasing the tang 28, turning the head 40 so the bead-breaking disc 37 or the extraction claw 38 is turned toward the platform 11, or vice versa, and then blocking again the tang 28 and with the rod 31 of the fluid dynamic cylinder 30. These two positions can be seen in FIG. 3 and in FIG. 1 respectively.

The introduction member 39 is on the other hand supported at the carriage 24 by means of a specific arm 41 that is parallel and lateral to this and which is made integral with it by means of a series of cross elements 42: this way, the introduction member 39 follows the movement of the carriage 24 toward the platform 11 or in an opposite direction, in fact downwards or upwards.

Furthermore, the arm 41 is in turn sliding horizontally between vertical guide elements indicated by 43 so as to convey the introduction member 39 toward the platform 11 or to withdraw it from this.

In detail, with reference to FIGS. 1-3 it will be seen that this introduction member 39 comprises a body with an upper portion 139 that is substantially cylindrical and is connected to a lower tapered portion 239, which shapes a sort of blade with the rounded point kept turned toward the platform 11.

The forward and backward sliding of the arm 41 is obtained by means of a fluid dynamic linear actuator 44 that pushes the arm 41 toward the platform 11 or withdraws it from this.

According to a first possible alternative embodiment, the arm 41 can also be operated manually by an operator and, in this case, the presence of the fluid dynamic linear actuator 44 is not necessary.

Figure 6:
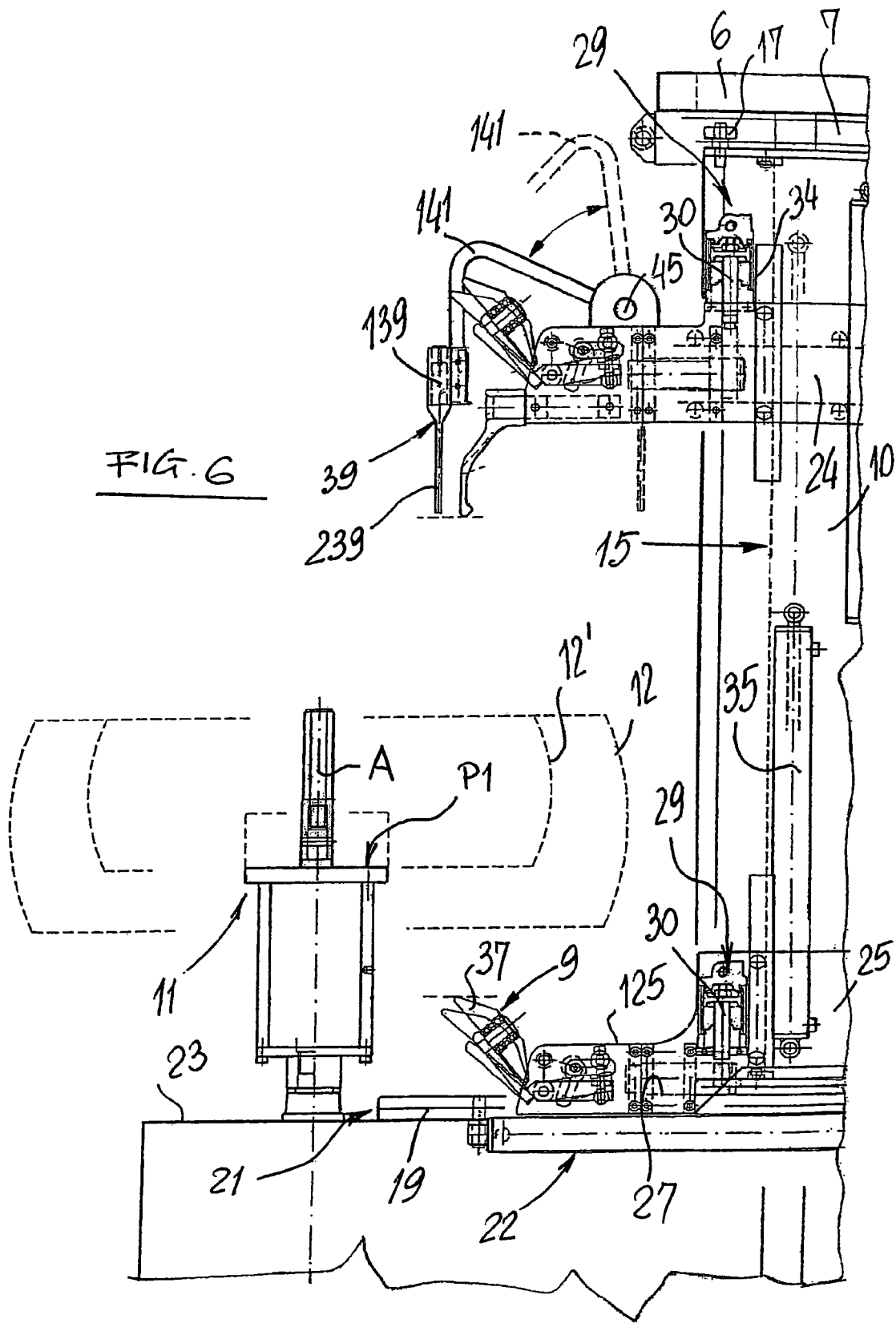
FIG. 6 is a side interrupted view of the tire-changing machine of FIG. 1 with an apparatus for tire-changing machines according to another embodiment.

According to a further alternative embodiment shown in FIG. 6, the arm, in this case indicated by 141, can have one end opposite that in which the introduction member 39 is fitted, hinged directly to the carriage 24 with a hinge 45 having a horizontal axis, in such a way that it is possible to lift the introduction member 39 when this does not have to be used or lower it toward the platform 11 when it has to be used to press on the beads of a tire, cooperating with the bead-breaker disc 37, as will be described later on.

The operation of the bead-breaking apparatus for tire-changing machines is the following: when a tire has to be removed from the rim of a wheel, an operator places the wheel on the platform 11, and locks the rim on the platform 11.

The tire can be deflated before or after, indifferently, once the wheel 12 has been locked on the platform 11.

During the locking of wheel 12 on the platform 11, the column 10 is moved to a position away from the latter, so as not to interfere with the locking operations.

The movement of the column 10 is by means of the operation of the linear actuator unit 22 that makes it slide along the upper longitudinal guides 7 and the lower longitudinal guides 19.

On the carriages 24 and 25 there are previously coupled the tools 9, which have to be used in the tire beading and removal operations. On the upper carriage, the head 40 is fitted, inserting the tang 28 in the relative seat 26 obtained in the carriage 24 and arranging the head so the bead-breaking disc 37 is turned toward the wheel 12, or 12' or 12", while the extraction claw 38 is turned upward, meaning, in a non-operating position.

When the positioning of the head 40 has been completed, the fluid dynamic cylinder 30 is started, which expels its rod 31 which is inserted in the transversal opening 32 of the tang 28, locking both its axial sliding and the rotation.

Similarly, a further bead-breaking disc 37' is fitted on the carriage 25 inserting the corresponding tang 28' of the corresponding head 40' in the specific seat 27 defined in the carriage 25.

This tang 28' is also blocked as described for previously, even though, the head 40' does not in this case have the claw 39 because this is not required in the tire removal operations.

It is important to note that when the two heads 40 and 40' are fitted on the respective carriages 24 and 25, the two bead-breaking discs 37 and 37' are aligned vertically one with the other or, more precisely, the edges of these which come into contact with the tire beads during bead-breaking operations are aligned.

In other words, the distances of both the bead-breaking discs 37 and 37' and the rotation axis of the platform 11, and therefore the distances between these and the edges of a rim of a wheel 12, are the same and remain constantly the same, even when the column 10 moves toward the platform 11 or moves away from this.

In other words, in a work position, there is no relevant movement between the bead-breaking discs 37 and 37', the claw 39 and the column 10.

When both the bead-breaking discs 37 and 37' are fixed to the respective carriages 24 and 25, the column 10 is made to move toward the platform 11 until the operator positions the upper bead-breaking disc 37 in a correct beading position. The lower bead-breaking disc 37' is therefore automatically positioned in the same correct beading position as the upper disc, without the operator having to check this position, which, as it has been mentioned, is achieved automatically, the two bead-breaking discs 37 and 37' being equidistant from the column 10.

The operator then operates the linear actuators 35 and 36 and makes both the bead-breaking discs 37 and 37' converge toward the beads of a tire of the wheel 12, and when these bead-breaking discs come into contact with the beads, they start to apply a pressure on these in the direction of the inner keying channel of the rim, until, making the platform 11 turn around its rotation axis "A", both of the beads completely detach from the respective edges of the rim.

To completely remove the tire from the rim, the operator therefore moves the carriages 24 and 25 slightly from the wheel 12 and proceeds to turn the head 40 fitted on the upper carriage 24.

In order to perform this operation, he/she deactivates the corresponding fluid dynamic cylinder 30, which withdraws its rod 31 outside the transversal opening 32 of the tang 28, which this way is free and can be turned inside the seat 26 until the extraction claw 38 is turned upward as can be seen in FIG. 4 or also in FIG. 1.

This way, the operator again makes the carriages 24 and 25 converge toward the supporting table "P1" of the platform 11; because the beaded tire is positioned inside the inner keying channel of the rim, it is loose with respect to this and the extraction claw 38 can easily introduce itself between the tire bead turned toward the operator and the corresponding edge of the rim.

The shape of the bead-breaker claw 38 is known and such as to fasten onto the relevant bead inside the tire and fully extract it from the rim when the carriage 24 is recalled upward and, at the same time, the platform 11 is turned.

When the operator has to fit a tire on the rim already locked on the platform 11, he/she performs the previously described operations in the opposite sequence.

In fact, he/she manually introduces the first bead of the side turned toward the platform 11 into the central keying channel of the rim and then, using only the bead-breaking disc 37 and therefore only the upper carriage 24, applies a pressure on the other bead turned toward him/herself and still outside the edge of the rim.

Nevertheless, the pressure applied in just one point is not by itself enough to ensure that, even by turning the platform 11, the bead completely comes over the edge of the rim, completing the fitting of the tire.

This situation is caused by the elasticity of the beads, which allows the deformation of the tire only in the area where the bead-breaking disc 37 presses, while the other parts of the remaining circumference of the tire tend to react to the imposed deformation and spontaneously recover their initial shape, correcting the deformation generated by the bead-breaking disc 37.

This characteristic of the beads allows them to come over the edge of the rim and move inside the central keying channel, only in the bead area where contact occurs with the corresponding bead-breaking disc 37, while all the other areas, even if they have already been introduced inside the keying channel of the rim, tend to come out again.

To avoid this drawback, the operator uses the introduction member 39, letting the arm 41 slide toward the platform 11 until the tapered portion 239 is aligned on the bead to be introduced into the keying channel of its own rim.

By lowering the carriage 24 toward the wheel 12 (or 12' or 12"), the introduction member 39 fits in between the bead of the tire and the edge of the rim and, in this position, keeps the bead taut in a substantially diametral direction, holding inside the keying channel the opposite bead areas already introduced into this channel by a previous pressure of the bead-breaking disc 37, notwithstanding the spontaneous tendency to come out, as it has been previously described.

To obtain this result, the introduction member 39 is placed at a pre-established distance "d" on the bead circumference, with respect to the bead-breaking disc 37, so that both the traction force of the introduction member 39 and the pressure force of the bead-breaking disc 37 are applied to the tire at the same time, at a distance one from the other and forcing the bead to remain toward the inside of the keying channel during the rotation of the platform 11.

This rotation must have a direction of rotation such that on the bead, the introduction member 39 is applied first and then the bead-breaking disc 37. This way, the bead of the tire is forced to fully come over the edge of the rim and the tire fitting operation is completed.

The arm 41 that supports the introduction member 39 can be operated both manually and automatically by means of a special actuator 44: in both cases stopping means are envisaged for stopping the sliding of the arm 41 with respect to the carriage 24, such as, for example, a transversal key that can be fitted manually or automatically, when the introduction member 39 is fitted between the bead of the tire to be fitted and the relevant edge of the rim.

In the further embodiment shown in FIG. 6, the introduction member 39 is positioned, instead of by sliding, by turning the arm 141 around the hinge 45 toward the platform 11 while, when not used, the arm 141 is turned upward with respect to the carriage 24.

What is claimed is:

1. An apparatus for a tire-changing machine comprising:
a base having a face turned upward;
a supporting and locking platform for a wheel, mounted rotatably on the face around a rotation axis and defining a supporting table; and
support means of tools extending upward from the base, the support means being movable along the base in a direction of movement perpendicular to the rotation axis so as to move closer or away from the rotation axis,
wherein the tools comprise,
one or more bead breaking elements to bead break or remove a bead of a tire from a rim of the wheel,
an introduction member fitted on first carriage means to hold the bead inside the rim and cooperating with the one or more breaking elements, and
an extraction tool.

2. The apparatus of claim 1, wherein the rotation axis is an axis substantially perpendicular to the face or an oblique axis with respect of the face.

3. The apparatus of claim 1, wherein the face is parallel to the direction.

4. The apparatus of claim 1, wherein movement means of the support means toward, or from, the rotation axis are provided between the base and the support means, the movement means comprising:
 guide means provided on the face in a longitudinal direction and having at least one end converging toward the rotation axis and ready to engage a concurrent engaging end of the support means; and
 actuator means placed in-between the concurrent end and the base.

5. The apparatus of claim 4, wherein the concurrent engaging end comprises:
 a second wing fastened crosswise perpendicular to the support means;
 running means provided on a surface of the second wing and turned toward the guide means for sliding engagement therewith, the support means comprising:
  a flat and straight column extending from the base and defining a bottom side turned toward the guide means,
  an opposite top side turned opposite the guide means, and
  two opposite edges parallel to each other and perpendicular to the top side and the bottom side, a first edge being turned toward the platform and a second edge being turned opposite; and
 the first carriage means and second carriage means fitted slidingly along the first edge and the second edge, the column defining a lying plane on which the rotation axis lies, the first carriage means and the second carriage means moving with operating means in directions converging to, or diverging from, the supporting table.

6. The apparatus of claim 5, wherein the first carriage means and the second carriage means are movable at the same time.

7. The apparatus of claim 5, wherein the directions converging to, or diverging from, the supporting table are substantially perpendicular to the supporting table.

8. The apparatus of claim 5, wherein the first carriage means and the second carriage means comprise:
 sliding and guided coupling means to the first edge and the second edge;
 actuator means to move the first carriage means and the second carriage means along the first edge and the second edge; and
 removable coupling means of the one or more bead-breaking elements to the first carriage means and the second carriage means, the coupling means comprising pairs of runners couplable to the first edge and the second edge.

9. The apparatus of claim 8, wherein the removable coupling means comprise:
 respective coupling and retention seats defined in each of the first carriage means and the second carriage means; and
 locking parts locking the one or more bead-breaking elements in the respective seats.

10. The apparatus of claim 9, wherein the one or more bead-breaking elements fitted on the first carriage means comprise:
 a head having a first end and an opposite second end, the first end having a coupling tang couplable in one seat of the respective seats, the second end having a first disc-shaped pressure body and a second extraction claw body usable alternatively to the first disc-shaped pressure body by rotating the head with respect to the one seat.

11. The apparatus of claim 9, wherein the one or more bead-breaking elements fitted on the first carriage means comprise a head having a first end and an opposite second end, the first end having a tang couplable in one seat of the respective seats and the second end having a second disc-shaped pressure body.

12. The apparatus of claim 11, wherein the first disc-shaped pressure body and the second disc-shaped pressure body have respective pressure edges aligned together on an alignment plane parallel to the rotation axis.

13. The apparatus of claim 5, wherein the first carriage means and the second carriage means are fitted on the column in positions respectively opposite to the supporting table, the first carriage means being fitted on the column in a position above a position of the second carriage means.

14. The apparatus of claim 1, wherein the introduction member is fitted on the first carriage means.

15. The apparatus of claim 14, wherein between the introduction member and the first carriage means adjustable support means are provided that are adjustable according to an adjustment direction parallel to the direction of movement, the adjustable support means comprising an arm mounted slidingly according to the adjustment direction on the first carriage means and having a first end turned toward the supporting and locking platform and an opposite second end, the arm being operated manually or automatically.

16. A method of fitting or removing a tire of a wheel on or from a rim, the method comprising:
 tightening the wheel on a supporting and locking platform of a tire-changing machine, the platform rotating around a rotation axis and defining a supporting and locking table; and
 positioning fitting or removal tools in an operating position near the wheel,
 wherein the fitting or removal tools are fittable on a common support element shaped as a support column extending from the tire-changing machine, and
 wherein the positioning comprises moving the common support element with respect to the tire-changing machine between a fitting or removal position near the platform and an idle position, away from the platform, and vice versa, the fitting or removal tools comprising bead-breaking tools, introduction tools, or extraction tools,
 wherein the moving comprises moving in a direction of movement to and from the platform, the direction of movement being straight and perpendicular to the rotation axis, and
 wherein the positioning comprises further moving the introduction tools with respect to the common support element in a direction parallel to the direction of movement.

* * * * *